June 14, 1960   H. L. OLSON   2,940,378
TOASTER
Filed March 26, 1956   4 Sheets-Sheet 1

FIG. I

INVENTOR:
HENRY L. OLSON
BY
ATT'YS

June 14, 1960     H. L. OLSON     2,940,378
TOASTER

Filed March 26, 1956     4 Sheets-Sheet 2

INVENTOR:
HENRY L. OLSON

ATT'YS

June 14, 1960 H. L. OLSON 2,940,378
TOASTER
Filed March 26, 1956 4 Sheets-Sheet 3
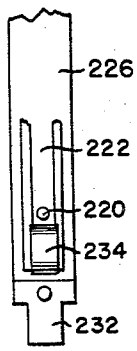
FIG. 8
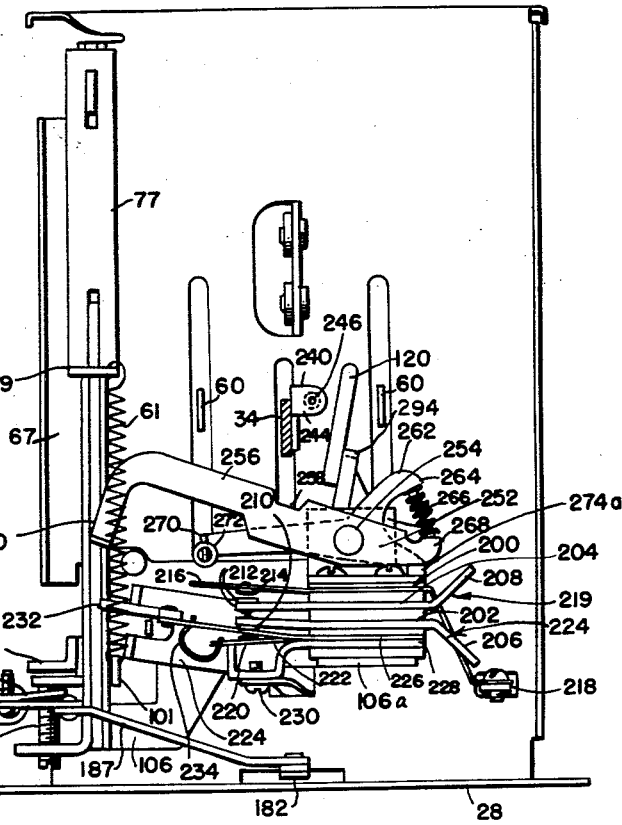
FIG. 3
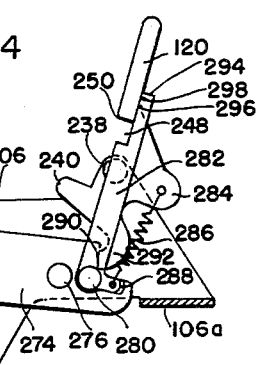
FIG. 9
FIG. 4
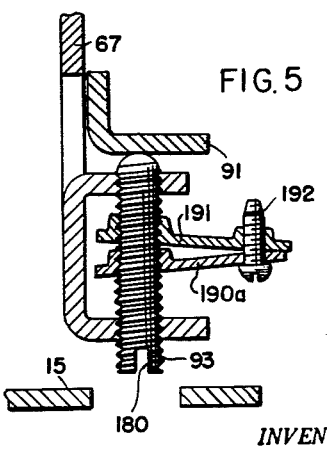
FIG. 5
INVENTOR:
HENRY L. OLSON
BY
ATT'YS June 14, 1960  H. L. OLSON  2,940,378
TOASTER Filed March 26, 1956  4 Sheets-Sheet 4

INVENTOR:
HENRY L. OLSON
BY
ATT'YS

United States Patent Office 2,940,378
Patented June 14, 1960

2,940,378
TOASTER

Henry L. Olson, Macon, Mo., assignor to Camfield Manufacturing Company, Grand Haven, Mich., a corporation of Michigan Filed Mar. 26, 1956, Ser. No. 573,738

10 Claims. (Cl. 99—329)

This invention relates to toasters and more particularly to a toaster of the automatic type having bread carriers movable to a toasting position and in which the bread carriers are released from this toasting position when the temperature at the surface of the bread reaches a predetermined level.

This application is a sole continuation-in-part of the joint application, Serial No. 459,138, now Patent No. 2,800,020 which in turn is a continuation-in-part of application, Serial No. 393,642, now Patent No. 2,863,378, filed November 23, 1953, which is a division of copending application, Serial No. 261,802, filed December 15, 1951, now Patent No. 2,692,549, issued October 26, 1954.

Prior to the present invention, automatic toasters have not operated satisfactorily because of residual sensible heat present within the toaster casing from previous toasting cycles. In these prior toasters were commonly employed timing devices which were characterized by cycles of varying duration to compensate for this residual heat, or were controlled by bi-metallic heat-responsive elements whose operation was a function of this residual heat. Controlling apparatus of the latter type also had to be compensated in order to vary the effect of the heat on the bread slices of successive toastings. A principal reason why mechanisms of this type have not been successful is that no means were provided to allow for variations in the voltage and power factor of the power lines. In addition, these mechanisms were unable to adjust themselves to breads of different densities and moisture content. Furthermore, in prior toasters utilizing bi-metallic heat-responsive devices, gradual deviation or creep from a set relationship was experienced because of variations in load strains on the bi-metallic elements at various temperature ranges. Also, these toasters were often characterized by electrically energized mechanisms when unused for toasting and were inconvenient for inspection of the toast during the toasting period since this changed the characteristics of either that particular piece of toast or the next succeeding piece of toast because of the fact that a toasting cycle had to be completed before fresh bread was inserted.

With this in mind, a primary object of the present invention is to provide a new and improved toaster of the automatic type in which the above stated objections and undesirable characteristics are obviated.

Another object of the present invention is to provide an automatic toaster which is capable of producing uniform toast of a preselected character regardless of wide variations in voltage and power factor in the power lines.

A further object of the invention is to provide a toaster of the stated type by means of which uniform toast may be obtained throughout repeated consecutive toasting cycles regardless of the moisture content and age of the bread.

It is another object to provide a toaster in which the toasting cycle is terminated in direct response to the level of heat at the surface of the bread being toasted independently of any timing relationship and independently of the residual heat within the toaster casing.

Another object of the invention is to provide a toaster in which the circuit of the heating elements may be opened in the event that the latch mechanism for any reason fails to operate.

It is an additional object to provide a toaster having a simple manual release from toastting position.

It is also an object to provide a toaster in which the toasting control mechanism is self-compensating against variation in toaster housing temperatures.

Another object of the invention is to provide a toaster which is deenergized when not in use but still plugged into the house current.

A further object of the invention is to provide an improved snap-action release in which the thermo-responsive element relaxes in its operation to a spring force that opens the heating circuit with slight effort and sets in motion a member whose inertia releases the bread carriers.

Another object of the invention is to provide a toaster of the stated type in which the tension of the thermo-responsive element may be efficiently and effectively adjusted to vary the color of the toast.

It is a further object of the invention to provide an improved toasting control in which the toasting operation can be terminated at any time for the same slice of toast or successive slices of bread without delay and without interfering with toast uniformity.

Other and further objects, advantages and features of the present invention will be apparent to those skilled in the art from the following description, taken in conjunction with the accompanying drawings in which similar reference characters relate to similar parts and in which:

Fig. 3 is an elevational view taken substantially on line 3—3 of Fig. 1 and showing the control elements in the position they assume when the bread carriers are in non-toasting position and the toaster is not operating;

Fig. 4 is an elevational detailed view of a portion of Fig. 3 with certain elements removed for the sake of clarity;

Fig. 5 is an enlarged vertical sectional view of the adjusting means for controlling the tension of the thermo-responsive element of the device of Fig. 1;

Fig. 8 is a plan view of the working end of the snap acting blade of the switch shown in Fig. 3; and Fig. 9 is a top view of the roller arrangement shown at the center of Fig. 3.

Figure 1:
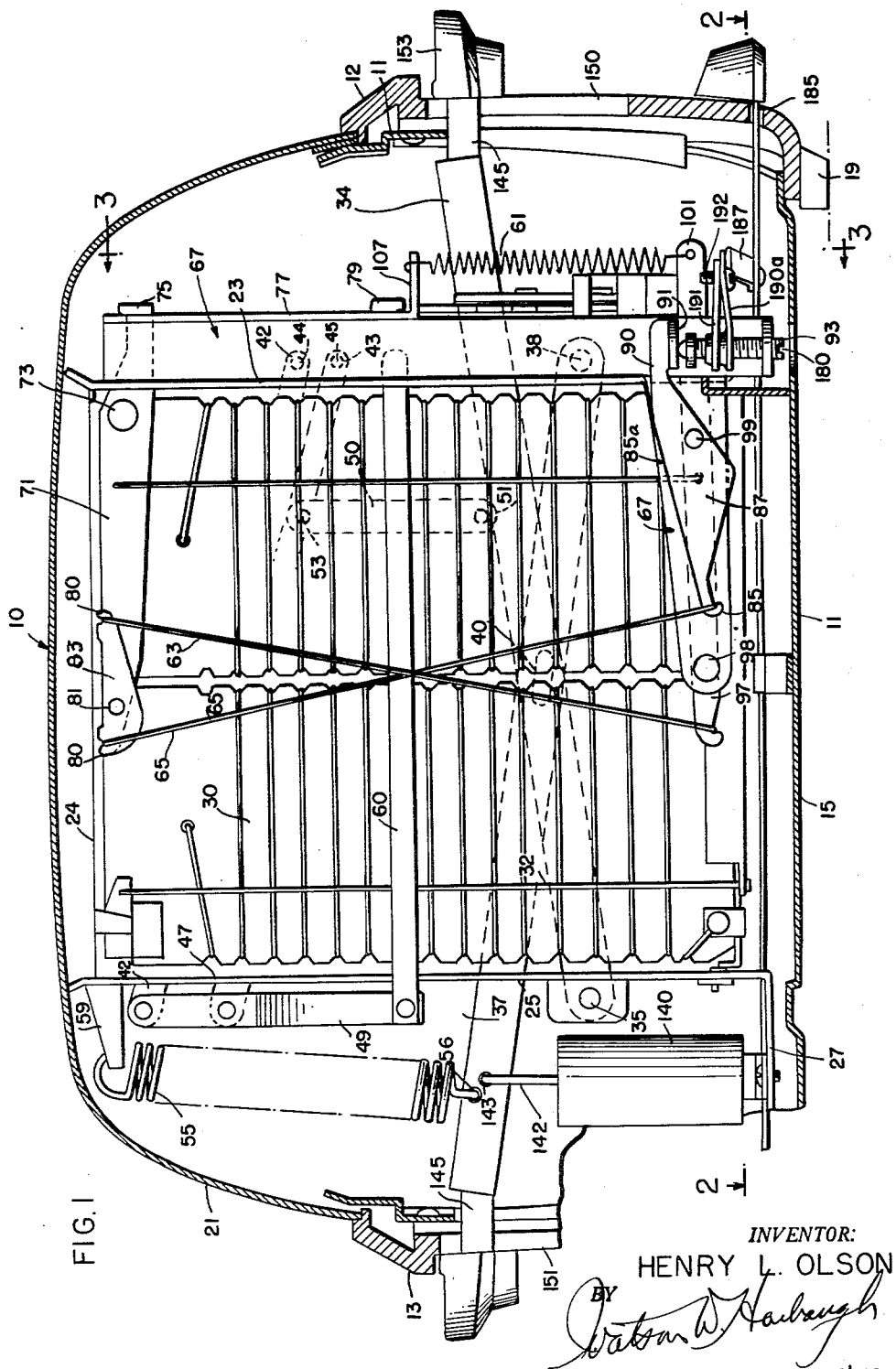
Fig. 1 is an elevational view, partly in section, of a toaster made in accordance with the present invention, with the housing or casing partly removed and with the bread carriers in the upper or non-toasting position.
Figure 2:
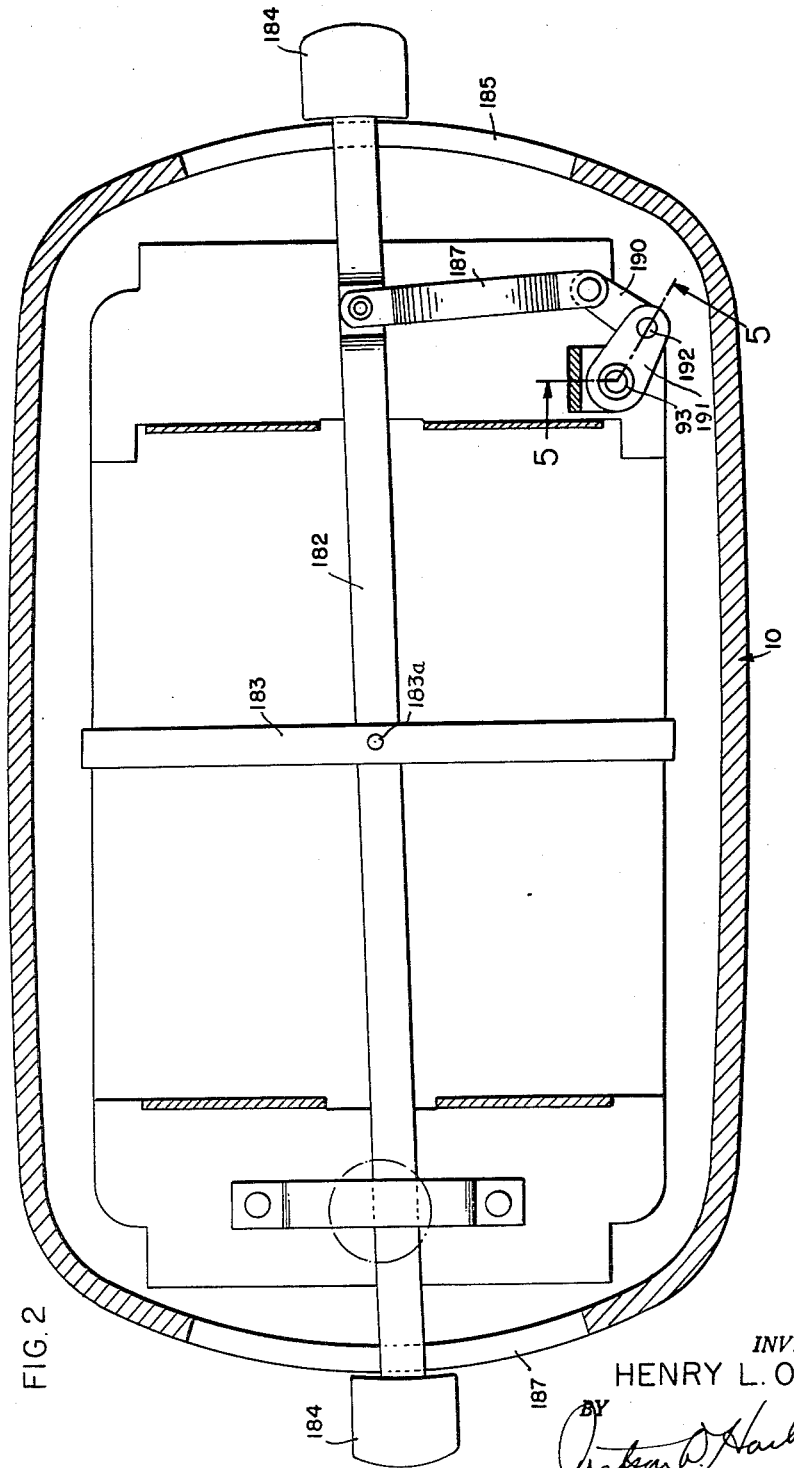
Fig. 2 is a plan view taken substantially on line 2—2 of Fig. 1.

Referring now to the drawings and more particularly to Figs. 1 and 2, the toaster of the present invention is indicated generally by the reference numeral 10 and includes a lower housing member 11 to which are secured end closure plates 12 and 13. These plates 12 and 13 may be secured to a bottom closure plate 15 by any suitable means and are provided with integrally formed feet 19 for supporting the assembly in spaced position above a table top or other surface. The housing is completed by an upper housing member 21 which is secured to the lower housing member and which, it will be understood, is provided with usual openings in its upper surface for the introduction and removal of bread to be toasted.

The toaster mechanism generally is supported on a U-shaped frame having a downwardly extending right end plate 23, an upper horizontal connecting portion 24 and a left downwardly extending end plate 25, as shown in Figs. 1 and 2. This frame plate has out-turned feet 27 and 28 which extend across and have their ends connected to the lower casing member 11. The interior mechanism is thus removable as a unit from the housing by taking out the connecting screws which are not shown. The housing supports a plurality of generally similar heating elements 30 which consist of resistance wire wound preferably on mica, as is customary in the art, it being appreciated that spun glass or asbestos sheets can be used. The bread is lowered between a pair of heating elements on a bread carrier 60 and held a spaced distance from the elements by the usual guide wires such as indicated at 32.

Figure 6:
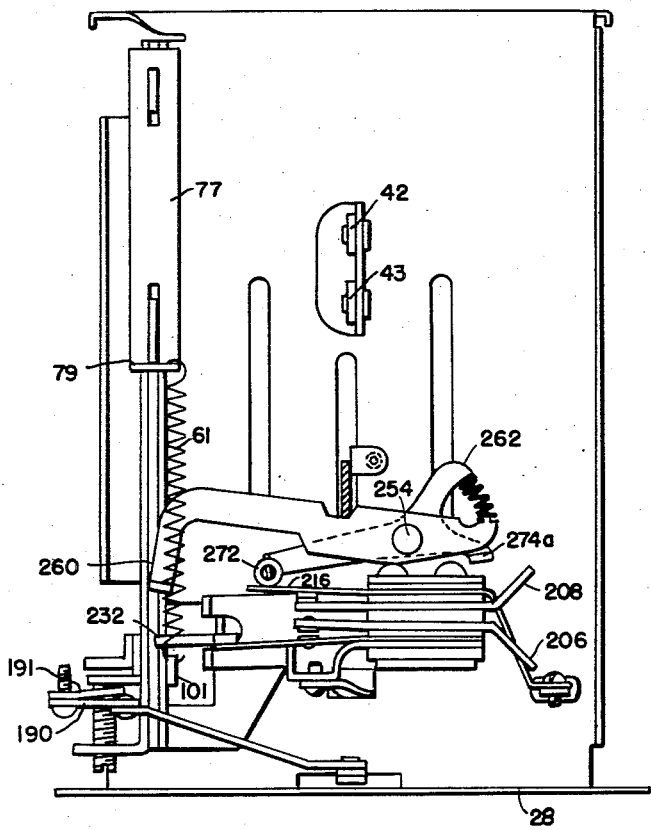
Fig. 6 is a view similar to Fig. 3 but showing the control elements in the position they assume when the bread carriers are lowered into toasting position.

A linkage is provided for raising and lowering the toast, this linkage being so connected that it is operable from either end of the toaster. The right-hand operating lever 34 extends through the center of the toaster between the inside heating elements and has its left end pivoted at 35 to the left end portion 25 of the frame member. Similarly the left-hand operating lever 37 extends parallel and adjacent to the lever 34 as pivoted at 38 to the right end 23 of the frame. The two levers are connected by pin and slot arrangement, as indicated generally at 40 (Fig. 1), by means of which downward movement of one lever causes similar downward movement of the other lever. The mechanism also includes a pair of intermediate levers 42 and 43, the ends of which are pivoted at 44 and 45 to the right-hand frame member 23 (Figs. 1 and 6). The opposite ends of these levers pass through the vertical slot 47 in the left end frame member 25 and are pivotally connected to a yoke 49. These intermediate levers, due to their parallel movement, cause the yoke 49 to move upwardly and downwardly parallel to the surface of the frame member 25. The movement of these intermediate levers and the yoke is caused by connecting link 50 which has its lower end pivotally connected at 51 to the right-hand main lever 34 and its upper end pivotally connected at 53 to the lower intermediate lever 43. The spacing of the link 50 from the pivots 35 and 45 determines the amplitude of movement of the yoke 49.

An actuating spring 55 has its lower end connected at 56 to the operating lever 37 and its upper end connected at 57 to a bracket 59 extending laterally from the left frame member 25. This spring 55 is a tension spring and normally maintains the parts in the position shown in Fig. 1. Bread carriers 60, such as shown in Fig. 1, extend inwardly from yoke 49 to support the slices between the heating elements and the effort of spring is sufficient to raise the carriers when laden with toast.

According to the present invention, the operating lever 37, and thus the bread carriers 60, are retained in toasting position by means of a latch 120, Fig. 4, which may be selectively released when the temperature at the surface of the bread reaches a predetermined level. To this end, a substantially U-shaped control support frame 67 is mounted on the U-shaped frame and is provided with a tension spring 61 operating to hold taut a pair of thermal wires 63 and 65 which are arranged to contact the bread being toasted. These wires are elongated with the increase of heat at the surface of the bread to terminate the toasting cycle in a manner hereinafter described.

The control support frame 67 is secured to the right end plate 23 and lies generally in a plane parallel to the heating elements. The control support frame 67 is provided with an arm 71 pivotally secured thereto at 73. At the right end of the arm 71, as viewed in Fig. 1, is a lug 75 which extends outwardly through an opening in a link 77 secured to the frame member 67 by a tang 79. The link 77 is preferably formed of a material such as brass having a higher coefficient of expansion than the steel of which the frame member 67 is formed. The purpose of this coefficient of expansion differential is to compensate for residual heat within the toaster housing, as will be hereinafter described. The material of which the link 77 is formed may be varied, it being important only that it have a greater coefficient of expansion than the steel support frame 67 so that a predetermined precise relationship between the component parts of the control frame 67 may be maintained at various temperatures ranges. Pivotally mounted at the outer end of the lever arm 71 about a pivot 81 is a lever 83 having at its outer ends hooks 80 to which the upper ends of the wires 63 and 65 are secured. It will be noted that the distance between the pivot point 81 and the hook 80 to which the wire 65 is secured is twice the distance between the pivot point and the hook to which the wire 63 is secured. This ratio is important, as will be apparent.

According to the present invention, the wires 63 and 65 are crossed so that both wires will come into contact with a slice of bread and the toasting cycle will not be terminated prematurely by exposure of the wires merely to direct radiation from the heating elements. The lower end of the wire 65 is connected at 85 to a lever 87 that is pivotally mounted at 99 on a foot section 85a formed integrally with the control frame 67. The lower end of the thermal wire 63 is connected to the inner end of a release lever 97 which is pivoted at 98 to the foot section 85a. The right end 90 of the lever 87 is provided with a horizontal extending ear 91 which is engaged by the upper end of an adjusting screw 93, the operation of which will be hereinafter described. It will be noted, however, that the point of connection at 85 between the wire 65 and the lever 87 serves as an adjustable fixed starting point for a sensitive system of movable linkages connected by the wires 63 and 65 and including the lever 83, the lever 87 and the release lever 97. The release lever 97 is offset to pass behind the foot section 85a and extends to the right beyond the control frame 67 and the right end plate 23 and has an apertured end 101, as shown best in Fig. 1. To the end 101 is secured the lower end of the tension spring 61. The upper end of the spring 61 is connected to a flange 107 formed integrally with the brass link 77. The tension spring 61 serves as a source of power to raise the end 101 of the lever 97 to terminate the toasting cycle when the wires 63 and 65 have been elongated sufficiently to relax the tension on the support frame 67.

Referring now to Fig. 3, the frame member 67 is provided with a laterally projecting vertical extension 106 having a horizontal flange 106a on which is mounted a multiple switch 200 which comprises spaced bus bars 202 and 204, having outwardly extending binding posts 206 and 208 respectively. At the inner end of the bus bar 202 is an electrical contact 210, and at the inner end of the bus bar 204 is mounted an electrical contact 212 disposed in the path of a cooperating contact 214 on a conducting strip 216 which is connected at 218 to the heating elements of the toaster and forms a separate switch 219. The contact 210 is arranged to be in the path of movement of a cooperating contact 220 mounted on a tongue 222 which is struck from the strip 226 to form with the outer end of the strip 226 an over-the-center snap action induced by the C spring 234 inter-engaging them when actuated by vertical movement of the outer end by the member 220 a part of a snap-acting switch 224. The tongue 222 forms an extension of the conductor strip 226 which is arranged in conducting relation to a conductor element 228 which is connected at 230 to the heating element circuit. At the outer end of the conducting strip 226 is an insulated inertia element 232, while the outer end of the tongue 222 is connected to a conventional arcuate spring 234. The component parts of the switches 219 and 224 forming the multiple switch 200 are electrically insulated each from the other by suitable dielectric material. The switches 219 and 224 are manually closed at the same time as one of the levers 34 or 37 is moved downwardly to bring the carriers 60 into toasting position. The carriers 60 are held in this position by means of the latch 120, which is pivoted at 238 to the lateral flange 106 of the control frame 67. The latch 120 is provided with an arm 240 which is engaged by the lower edge of the lever 34 as it is moved manually downwardly to rotate the latch 120 to latching position. For this purpose, a bracket 242 having parallel ears 244 in which is journalled a roller 246 is mounted on one side of the lever 34, and the latch 120 is formed with a recess 248 defining a shoulder 250 which overlies the roller 246 to retain the lever 34 and the bread carriers 60 in toasting position. At the same time that the lever 34 is moved downwardly to be latched, the switches 219 and 224 are closed. To this end, an L-shaped bracket 252 is superposed in insulating relation on the switch 200, and on the upright portion of this bracket is pivoted at 254 a lever 256 having on its upper edge a recess 258 for engagement by the lower edge of the lever 34. The lever 256 has at one end a downwardly projecting arm 260 which engages the insulated element 232 at the outer end of the conducting strip 226.

As the element 232 is moved downwardly, the arcuate spring 234 is actuated to snap the tongue 222 upwardly so that the contact 220 is brought into engagement with the contact 210. At the same time, the switch 219 is closed by means of a lever 262 which is also pivoted at 254 on the bracket 252, and is provided at its right end with a hooked arm 264 which is joined by a compression spring 266 to a hooked arm 268 at the right end, as viewed in Fig. 3, of the lever 256. When the lever 34 is urged into engagement with the upper edge of the lever 256 at the recess 258, the hooked arm 268 is urged in a counterclockwise direction; the spring 266 is compressed; and the lever 262 moved in the same direction. At the left end of the lever 262 is a transversely extending arm 270 on which is rotatably mounted a roller 272 desirably of ceramic material. As the lever 262 is rotated, the roller 272 is brought into rolling contact with the left end of the conductor element 216, and the contact 214 is thus brought into engagement with the contact 212, and the circuit is completed, as shown in Fig. 6.

When the control frame 67 is relaxed upon elongation of the wires 63 and 65, the end 101 of the lever 97 is urged upwardly by spring 61 into contact with the insulated element at the left end of the conductor strip 226. The left end of the strip 226 is moved upwardly beyond a predetermined point thus causing the arcuate spring 234 to snap the tongue 222 downwardly and separating the contacts 210 and 220 to break the heavy electrical circuit with a fast snap action. As the insulating element 232 moves upwardly, it contacts the lower end of the arm 260 of the lever 256 and pivots the lever 256 in a clockwise direction about the pivot 254. The lever 262 is provided with an outwardly extending foot 274a (Figs. 3 and 6) which is engaged by the lower edge of the arm 268 of the lever 256 so that the lever 262 is rotated clockwise also. By this movement, the roller 272 is brought out of contact with the left end of the conductor strip 216 which is normally urged into the position shown in Fig. 3 to open the contacts 212 and 214, which being slower acting to safety-break the other side of a dead circuit is less critical in its operation.

This upward movement of the insulating member 232 also affords release of the latch 120. To this end, a latch-release lever 274 is mounted on the element 106 for pivotal movement about a pivot 276. The left end of the lever 274, as viewed in Fig. 4, is bifurcated and the outer ends of the arms thus formed are bent to a position normal to the plane of this lever. The pivotal movement of the lever 274 is limited by a tongue 278 which in the form shown is struck from the element 106. To the right of the pivot 276 on the lever 274 is a pivot 280 for a latch-holding lever 282. At the right side of the latch 236, as viewed in Fig. 4, is a bent ear 284 to which is secured one end of a tension spring 286. The other end of the tension spring 286 is connected to an arm 288 which is formed integrally with the latch-holding lever 282 and is bent outwardly from the plane of the release lever 274. At the right side of the release lever 274 is a recess forming a shoulder 290 against which abuts a curved arm 292 extending from and forming a part of the latch 120. As the lever 34 is moved downwardly manually and is brought into contact with the arm or shoulder 240 of the latch 120, the curved arm 292 is swung outwardly in a counterclockwise direction, thus permitting rotation of the lever 274 in the same direction. The spring 286 acting on the arm 288 of the lever 282 effects this rotation of the lever 274 to the position shown in Fig. 6. At the same time, the lever 282 is moved into latch-holding position. To this end, a laterally extending arm 294 is formed at the upper end of the lever 282 to overlie a shoulder 298 formed on the rear edge of the latch 296. The spring 286 also serves to return the latch 236 to the position shown in Fig. 4.

Referring now more particularly to Fig. 6, the bifurcated end of the lever 274 is arranged to straddle the insulating element 232. As the element 232 is snapped upwardly, it engages with considerable force the outturned arms of the bifurcated end of the lever 274. By this movement, the lever 274 is moved to the position shown in Fig. 4, in which position the spring 286 urges the latch 120 to the release position shown.

When an inspection of the toast is desired while the latch 120 is in latching relation with the lever 34, the lever 34 is moved by hand downwardly, thus releasing the strain on the latch. Then the strain is removed, the spring 286 is then operative to swing the latch 120 to its release position. The lever 274 is swung in a clockwise direction and the element 232 is snapped upwardly to deenergize the switch 224. As the element 232 is swung upwardly, it engages the lever 256 and opens the switch 219. After this release, the lever 34, in response to the action of the spring 55, follows the fingers of the operator upwardly as the downward pressure is relaxed.

When the bread carriers 60 move upwardly after a latch release, it is preferred that the upward movement be cushioned by a dashpot 140 which contains a piston operated by a piston rod 142, the upper end of which is connected at 143 to the left operating lever 37.

For purposes of convenience in assembly and in operation, a removable operating arm 145 can be attached to each of the operating levers 34 and 37. The members 145 pass through narrow slots 150 and 151 in the end closure plates 12 and 13, respectively. Handles 153 are secured to the outer ends of the members 145 by any suitable means.

It will be apparent that the wires 63 and 65, when at room temperature, will be of such a length as to pull up on the left hand side of the release lever 97 causing its right hand 101 to be swung downwardly. When a piece of bread is inserted in the side of the toaster carrying the operating assembly including the wires 63 and 65, the bread will be closely adjacent or in contact with these wires. Since these wires are crossed, the bread is more likely to come into contact with both of these wires and preclude the influence on the wires of direct radiation from the heating elements. The finger-piece or handle 153 at either end of the toaster may be depressed and the bread carriers 60 carried by yoke 49 will move downwardly carrying the bread through the toasting position. As this downward movement takes place, the lower edge of the right operating lever 34 engages the lever 256 and the switches 219 and 224 are closed, as above described. As described also, this downward movement of the lever 34 also brings the latch 36 into operative position.

By way of example, and not by way of limitation, in an actual toaster constructed in accordance with the drawing, it has been found that the wire 63 will expand or lengthen according to the temperature of the toast approximately .004 inches. The pivoted member 83 has a two to one ratio so that with the lower end of the wire 65 held in fixed position by the foot 85 as at 85, this expansion of the wire 63 will permit the left end of member 83 and the wire 65 to move downwardly .008 inch. The wire 65 is identical to the wire 63 and has an additional .004 inch expansion. This permits a total downward movement of the left end of lever 97 of .012 inch. Lever 97 has an eight to one ratio so that the end 101 of that lever, where it engages the insulated member 232, will have approximately 3/32 of an inch movement. Thus, as the heat of the bread surface is raised, the wires 63 and 65 expand and the levers swing in the directions just described. The right end of the lever 97 is actually drawn upwardly by the spring 61, while this movement is afforded by the expansion of the wires.

It will be apparent that the control wires 63 and 65 carry no current, but are controlled entirely as to their expansion by heat which they receive by radiation or by contact and are thereby not effected by other self-induced heat and variations therein due to voltage changes. Consequently, the operation of the toaster is entirely independent of any variation in the line voltage applied to the toaster. The same is true, of course, as to wide variations in the line power factor of the electrical supply to the toaster. The toaster will also be uniform regardless of the moisture content of the bread being toasted. If the bread is moist, the drying off of the moisture will have a cooling effect on the control wires so that the toasting cycle will be properly prolonged and will adequately and uniformly toast the bread after excess moisture is driven out.

Also, the toaster, as designed, will operate uniformly throughout consecutive toasting cycles. The frame member 67 will increase in height as the toaster gradually heats up, this member being made of steel in the preferred form. This increase in height would have the effect of modifying the actuation of the toaster were no compensation provided. The expansion would be in the opposite direction to the operating expansion of the wires desired, in that it would raise the upper ends of the wires. To take care of this, the upper end of the wires are supported from the pivoted arm 71 which is supported from the frame member 67. The lug 75 at the outer end of the arm 71, however, extends through the compensating link 77 which may be formed of brass. This link 77 will expand to a greater extent than the control frame 67 so that as the pivot 73 moves upwardly, the lug 75 of the arm 71 moves upwardly more rapidly than the pivot. The ratio of the lever 71 and the lug 75 is such as to properly compensate for the expansion of the support frame 67. The toasting cycle will thus be uniform regardless of the temperature of the interior of the toaster and of the frame member 67. It will be understood that various materials may be used for the frame 67 and for the compensating link 77 and that the lengths of the various lever arms forming the sensitive tension system will be dependent upon the ratios of expansion of the members 67 and 77. To this end also, the connection of the upper end of the tension spring 61 to the link 77 provides further compensation for the effect of residual heat within the casing. As the compensating link 77 expands the flange 107 is moved downwardly a small increment which diminishes to some extent the effect of the spring 61.

It has been pointed out that the screw 93 serves to raise or lower the right end 90 of the lever 87 so as to adjust for the desired darkness or lightness of toast. This screw may be adjusted from below by a screwdriver engaging the head 180. According to the present invention, however, efficient and effective means are also provided for manual adjustment of the character of the toast while the toaster is in operation. Referring now to Fig. 2, an elongated lever 182 is pivotally secured at 183a to a cross-member 183 which is fixedly mounted to the toaster mechanism. The outer ends of the lever 182 extend through slots 185 and 187 in the elements 12 and 13, respectively. The lever 182 may be pivoted about its central pivot point from either end of the toaster by grasping handles 184 and moving these handles in a horizontal direction. This color control bar 182 is connected by a link 187 to a short link 190 which in turn is connected to a crank 190a, the other end of which is frictionally secured as will be shortly explained to the screw 93. Also frictionally secured to the screw 93, in superimposed relation to the crank 190a, is a short arm 191 which is secured to the crank 190a by means of a set screw 192 which cocks the members 190a and 191 and causes them to bind on the threads of screw 192. As the right end of the lever 182 is moved downwardly, as viewed in Fig. 2, the screw 93 is turned clockwise, or in other words lowered with respect to lever 87 (Fig. 1), to afford upward movement of the release lever 97 to minimize the distance it must travel in order to trip the insulated member 232 and thus terminate the toasting cycle. On the other hand, upward movement of the right end of the lever 182, as viewed in Fig. 2, effects raising of the right end 90 of the lever 87 (Fig. 1) and lowering of the right end 101 of the lever 97 so that a greater distance must be traveled by the end 101 of lever 97 in order to trip the control mechanism.

Figure 7:
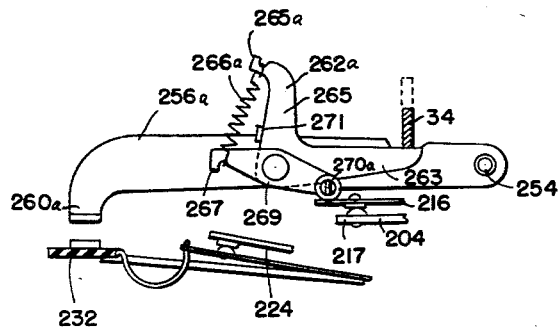
Fig. 7 is an elevational view of a modified form of the present invention.

In Fig. 7 is shown a modified form of the present invention in which a lever 256a is mounted for pivotal movement about the pivot 254. Midway between the pivot 254 and the downwardly extending arm 260a, however, is pivotally mounted a lever 262a having an arm 263 adapted to be engaged by the lever 34 as it moves downwardly, and an arm 265 having at its outer end a hook 265a to which is secured one end of a spring 266a. The other end of the spring 266a is connected to a hook 267 on a lever 269, on the other end of which is rotatably mounted a ceramic roller 270a. As the lever 34 is moved downwardly, the lever 256a is pivoted in a counterclockwise direction to engage the insulated element 232, as in the principal form of the invention, to close the switch 224. At the same time, the lever 34 engages the arm 263 of the lever 262a to pivot this lever about its axis, thus stretching the spring 266a and rotating the lever 269 in a clockwise direction so that the roller 270a engages the outer end of the conducting strip 216. Projecting at an angle from a plane of the arm 265 is a lug 271 which engages the top edge of the left side of the lever 269 to effect counterclockwise rotation of this lever to afford opening of the switch 219. As in the principal form of the invention, the switches 219 and 224 may be opened when the temperature at the surface of the bread reaches a predetermined level or when the lever 274 is actuated by the manual release of the lever 34.

While I have shown certain preferred embodiments of my invention, it will be understood that these embodiments are illustrative only and that various modifications may be made to meet varying conditions and requirements. I, therefore, contemplate such variations as come within the spirit and scope of the appended claims.

I claim:
1. In a food-cooking device the combination of heating means, food-shifting means including carriers for moving the food between two positions in one of which the food is in close proximity to the heating means, a first lever for moving said carriers into said one position, means including a latch engageable with said lever for releasably retaining said food-shifting means in said one position, switch means operable in response to the movement of said food-shifting means to said one position for energizing said heating means, said switch means including a first switch adapted to be closed by a second lever actuated by said first lever and having a snap-acting inertia element, and a second switch mounted on said first switch and adapted to be closed by a third lever actuated by said first lever, means for releasing said latch and opening said switches when the temperature at the surface of the food reaches a predetermined level, said last-named means including a pair of thermal wires adapted to contact the food during the cooking cycle and a release lever actuatable by the elongation of said wires to trip said inertia element so that it engages said second lever to open said first switch and releases said latch, said third lever being actuatable by said second lever for opening said second switch, and means for varying the effective distance of travel of said release lever and thus the duration of the cooking cycle, said last-named means including an adjusting screw for raising or lowering said release lever so that the degree of elongation of said wires necessary to trip said latch and open said switches is varied, said screw being operable by a centrally-pivoted lever adapted to actuate a crank frictionally secured to said screw and an arm secured to said crank and frictionally engaging said screw.

2. In a food-cooking device the combination of heating means, food-shifting means including carriers for moving the food between two positions in one of which the food is in close proximity to the heating means, a first lever for moving said carriers into said one position, means including a latch engageable with said lever for releasably retaining said food-shifting means in said one position, switch means operable in response to the movement of said food-shifting means to said one position for energizing said heating means, said switch means including a first switch adapted to be closed by a second lever actuated by said first lever and having a snap-acting inertia element, and a second switch mounted on said first switch and adapted to be closed by a third lever actuated by said first lever, means for releasing said latch and opening said switches when the temperature at the surface of the food reaches a predetermined level, said last-named means including a pair of thermal wires adapted to contact the food during the cooking cycle and a release lever actuatable by the elongation of said wires to trip said inertia element so that it engages said second lever to open said first switch and releases said latch, said third lever being actuatable by said second lever for opening said second switch, and means for varying the effective distance of travel of said release lever and thus the duration of the cooking cycle, said last-named means including an adjusting screw for raising or lowering said release lever so that the degree of elongation of said wires necessary to trip said latch and open said switches is varied, and means for rotating said screw, said last-named means including an elongated centrally-pivoted lever accessible from either end of said cooking device, a crank frictionally connected to said screw, an arm frictionally connected to said screw in superimposed relation to said crank and having its outer end secured to the apex thereof and a link connecting said elongated lever and said crank.

3. In a food cooking device, the combination of heating means, means including carriers for moving food between two positions in one of which the food is in close proximity to the heating means, latch means for releasably retaining said food-moving means including a plurality of thermally responsive wires adapted to be contacted by the food when the carriers are in said one position and being operative normally upon elongation to release said latch means, a pair of switches for the heating means, a lever pivotally movable with said carriers to close one of said switches when said carriers are in said one position, a lever operable by said first lever to close the other of said switches when said one switch is closed, and means for releasing said latch means when said wires are elongated to a predetermined extent.

4. In a food cooking device, the combination of heating means, means including carriers for moving food between two positions in one of which the food is in close proximity to the heating means, latch means for releasably retaining said food-moving means in said one position, a plurality of thermally responsive wires adapted to be contacted by the food when the carriers are in said one position and being operative normally upon elongation to release said latch means, a pair of switches for the heating means, an L-shaped lever pivotally movable with said carriers to close one of said switches when said carriers are in said one position, said one switch being a snap-acting switch having an insulated inertia element adapted to be contacted by the foot of said L-shaped lever, a lever operable by said first lever to close the other of said switches when said one switch is closed, and means for releasing said latch means when said wires are elongated to a predetermined extent.

5. In a food cooking device, the combination of heating means, means including carriers for moving food between two positions in one of which the food is in close proximity to the heating means, latch means for releasably retaining said food-moving means in said one position, a plurality of thermally responsive wires adapted to be contacted by the food when the carriers are in said one position and being operative normally upon elongation to release said latch means, a pair of switches for the heating means, an L-shaped lever pivotally movable with said carriers to close one of said switches when said carriers are in said one position, said one switch being a snap-acting switch having an insulated inertia element adapted to be contacted by the foot of said L-shaped lever, a lever operable by said first lever to close the other of said switches when said one switch is closed, said second lever being pivotally mounted coaxially with said first lever and spring biased away from said first lever and being adapted to removably contact a conductor element of said second switch, and means for releasing said latch means when said wires are elongated to a predetermined extent.

6. In a food cooking device, the combination of heating means, means including carriers for moving food between two positions in one of which the food is in close proximity to the heating means, latch means for releasably retaining said food-moving means in said one position, a plurality of thermally responsive wires adapted to be contacted by the food when the carriers are in said one position and being operative normally upon elongation to release said latch means, a pair of switches for the heating means, an L-shaped lever pivotally movable with said carriers to close one of said switches when said carriers are in said one position, said one switch being a snap-acting switch having an insulated inertia element adapted to be contacted by the foot of said L-shaped lever, a lever operable by said first lever to close the other of said switches when said one switch is closed, and means for releasing said latch means when said wires are elongated to a predetermined extent, said last-named means including a lever actuated by said wires to energize said first switch into open position.

7. In a food cooking device, the combination of heating means, means including carriers for moving food between two positions in one of which the food is in close proximity to the heating means, latch means for releasably retaining said food-moving means in said one position, a plurality of thermally responsive wires adapted to be contacted by the food when the carriers are in said one position and being operative normally upon elongation to release said latch means, a pair of switches for the heating means, an L-shaped lever pivotally movable with said carriers to close one of said switches when said carriers are in said one position, said one switch being a snap-acting switch having an insulated inertia element adapted to be contacted by the foot of said L-shaped lever, a lever operable by said first lever to close the other of said switches when said one switch is closed, and means for releasing said latch means when said wires are elongated to a predetermined extent, said last-named means including a lever actuated by said wires to energize said first switch into open position, said inertia element actuating said second switch into open position upon opening of said first switch.

8. In a food cooking device, the combination of heating means, means including carriers for moving food between two positions in one of which the food is in close proximity to the heating means, latch means for releasably retaining said food-moving means in said one position, a plurality of thermally responsive wires adapted to be contacted by the food when the carriers are in said one position and being operative normally upon elongation to release said latch means, a pair of switches for the heating means, an L-shaped lever pivotally movable with said carriers to close one of said switches when said carriers are in said one position, said one switch being a snap-acting switch having an insulated inertia element adapted to be contacted by the foot of said L-shaped lever, a lever operable said first lever to close the other of said switches when said one switch is closed, and means for releasing said latch means when said wires are elongated to a predetermined extent, said last-named means including a lever actuated by said wires to energize said first switch into open position, said inertia element actuating said second switch into open position upon opening of said first switch, said last-named means including a latch holding lever, a latch release lever connected by spring means to said latch holding lever, and means responsive to the opening of said first switch for biasing said latch release lever and spring means into latch release position.

9. In a food cooking device, the combination of heating means, means including carriers for moving food between two positions in one of which the food is in close proximity to the heating means, latch means for releasably retaining said food-moving means in said one position, a plurality of thermally responsive wires adapted to be contacted by the food when the carriers are in said one position and being operative normally upon elongation to release said latch means, a pair of switches for the heating means, an L-shaped lever pivotally movable with said carriers to close one of said switches when said carriers are in said one position, said one switch being a snap-acting switch having an insulated inertia element adapted to be contacted by the foot of said L-shaped lever, a lever operable by said first lever to close the other of said switches when said one switch is closed, and means for releasing said latch means when said wires are elongated to a predetermined extent, said last-named means including a lever actuated by said wires to energize said first switch into open position, said inertia element actuating said second switch into open position upon opening of said first switch, said last-named means including a latch holding lever, a latch release lever connected by spring means to said latch holding lever, and bifurcated means actuated by said inertia element to move said release lever into latch release position.

10. In a food cooking device, the combination of heating means, means including carriers for moving food between positions in one of which the food is in close proximity to the heating means, latch means for releasably retaining said food-moving means in a plurality of thermally responsive wires adapted to be contacted by the food when the carriers are in said one position and being operative normally upon elongation to release said latch means, a pair of switches for the heating means, a lever pivotally movable with said carriers to close one of said switches when said carriers are in said one position, a lever operable by said first lever to close the other of said switches when said one switch is closed, and means for releasing said latch means when said wires are elongated to a predetermined extent, said wires being crossed whereby to afford maximum heat-contact with food which may be in said carriers.

References Cited in the file of this patent

UNITED STATES PATENTS

| | | |
|---|---|---|
| 2,570,453 | Huck | Oct. 9, 1951 |
| 2,622,505 | Olson et al. | Dec. 23, 1952 |
| 2,655,860 | Smith | Oct. 20, 1953 |
| 2,692,549 | Olson et al. | Oct. 26, 1954 |